(12) United States Patent
Yamada et al.

(10) Patent No.: US 6,238,150 B1
(45) Date of Patent: May 29, 2001

(54) DRILLING TOOL

(75) Inventors: Jun Yamada, Gifu-ken; Kazumasa Miura, Kitakyusyu, both of (JP)

(73) Assignees: Mitsubishi Materials Corporation, Tokyo; Yoshikawa Kogyo Corporation, Kitakyusyu, both of (JP)

( * ) Notice: Subject to any disclaimer, the term of this patent is extended or adjusted under 35 U.S.C. 154(b) by 0 days.

(21) Appl. No.: 09/429,608

(22) Filed: Oct. 29, 1999

(51) Int. Cl.$^7$ ........................................... B23B 51/08
(52) U.S. Cl. .............................. 408/224; 407/9; 408/154; 408/713; 408/714
(58) Field of Search ........................ 408/224, 227, 408/230, 713, 714, 117–119, 154, 156, 199, 211, 22, 26; 407/8–10

(56) References Cited

U.S. PATENT DOCUMENTS

| | | | |
|---|---|---|---|
| 2,663,203 | * 12/1953 | Fried et al. | 408/154 |
| 2,878,696 | * 3/1959 | Busch | 408/154 |
| 3,940,214 | * 2/1976 | Waschek | 408/26 |
| 4,786,217 | * 11/1988 | Johne | 407/9 |
| 5,336,026 | * 8/1994 | Noggle | 408/154 |
| 5,803,679 | * 9/1998 | Heule | 408/211 |

FOREIGN PATENT DOCUMENTS

| | | | |
|---|---|---|---|
| 8-155716 | * 6/1996 | (JP) | 408/714 |
| 2641694 | * 8/1997 | (JP) | 408/714 |

* cited by examiner

*Primary Examiner*—Steven C. Bishop
(74) *Attorney, Agent, or Firm*—Oblon, Spivak, McClelland, Maier & Neustadt, P.C.

(57) ABSTRACT

A drilling tool includes a tool main body having a cutting edge at its forward end, a groove provided in the outer peripheral surface provided at the forward end of the tool main body, a cartridge accommodated in the groove and capable of elastic deformation in a radial direction of the tool main body, and a burr removing tip in the form of a substantially triangular flat plate detachably mounted to the cartridge and capable of protruding from and retracting into the outer peripheral surface of the tool main body. The cartridge is equipped with two holding walls which are in face contact with the two side surfaces of the three side surfaces corresponding to the three sides of the triangle formed by the burr removing tip. The two side surfaces of the burr removing tip are in face contact with the two holding walls, and the remaining one side surface is mounted to the cartridge in an open state.

8 Claims, 8 Drawing Sheets

DRILLING TOOL

BACKGROUND OF THE INVENTION

1. Field of the Invention

The present invention relates to a drilling tool endowed with a burr removing function which makes it possible to remove burrs as they are generated on the obverse and reverse sides of a metal plate such as a steel plate, copper plate or aluminum plate when drilling a hole in it.

2. Description of the Related Art

When drilling a hole in a metal plate such as a steel plate with a drilling tool such as a drill, burrs may be generated on the obverse and reverse sides of the metal plate. These burrs make it impossible, for example, to obtain an appropriate clamping force when clamping the metal plate with bolts, rivets or the like. In view of this, a post-processing operation for removing burrs is conventionally performed by using a grinding tool such as a grinder. This burr removing operation requires a lot of effort and time.

To solve this problem, a drilling tool endowed with a burr removing function making it possible to remove burrs as they are generated on the obverse and reverse sides of a workpiece such as a metal plate when drilling a hole in it has been proposed in, for example, Japanese Patent No. 2641694 and Japanese Patent Laid-Open No. 8-155716.

In the drilling tool described in these publications, a cutting edge is provided at the forward end of chip discharging grooves formed in the outer periphery of the tool main body rotated around an axis, and a groove is formed parallel to the axis at the forward end of a land defined between the chip discharging grooves, a burr removing tip held by a cartridge being mounted to this groove such that it can protrude from and retract into the outer peripheral surface of the tool main body. In the above-mentioned cartridge, an arm-like movable portion extending straight parallel to the axis is accommodated in the groove with its rear end portion being supported by the tool main body. The burr removing tip is mounted to the forward end of this movable portion, and the movable portion itself is deformed or rotatably supported by a pin or the like, whereby this burr removing tip can be displaced radially with respect to the tool main body. Further, a resilient force is generated through the deformation of the movable portion, and a plate spring, a compression coil spring or a plurality of belleville springs or the like are provided between the movable portion and the bottom surface of the groove, whereby the burr removing tip is biased toward the outer periphery of the tool.

Further, this burr removing tip is formed substantially as an equilateral-triangular flat plate, with cutting edges being formed on the two sides crossing at the corner portions of the equilateral-triangular surface constituting the scooping surface. This scooping surface is directed in the tool rotating direction, and one of the corner portions is positioned on the outer peripheral side of the tool. The cutting edge crosses the corner portion being mounted so as to angularly protrude from the outer peripheral surface of the tool main body toward the outer peripheral forward end portion of the tool and the outer peripheral rear end portion of the tool. Further, this burr removing tip is mounted to the cartridge such that one corner portion of the equilateral-triangular surface protrudes from the outer periphery of the tool and the bottom side opposed to this corner portion is substantially parallel to the axis of the tool main body as seen from the tool rotating direction.

In this drilling tool, a hole is formed in the workpiece by the cutting edge by causing the tool main body to proceed while rotating, and the peripheral edge of this hole is cut by the cutting edge directed to the outer peripheral forward end of the tool of the burr removing tip, so that it is possible to remove the burrs generated in the opening edge or perform beveling on the peripheral edge of this opening. When the tool main body is caused to further proceed, this burr removing tip is pushed into the inner periphery of the hole of the workpiece to temporarily get within the tool main body, and when the through-hole is formed and the burr removing tip gets out of the hole, it protrudes again from the outer periphery of the tool main body by being biased by the cartridge, so that, by retracting the tool main body from there, it is possible to burr removal, beveling, etc. on the opening peripheral edge of the through-hole.

In this drilling tool endowed with such a burr removing function, the burr removing tip can protrude and retract, so that the abutment of the cutting edge at the time of burr removing operation is unstable, and the sharpness of the cutting edge slightly deteriorates, resulting in a degeneration of the burr removing function. In the drilling tool described in Japanese Patent No. 2641694, the fixation of the burr removing tip in the form of an equilateral-triangular plate is effected by constraining the three sides (the sides connected to the three sides of the triangle) of the burr removing tip with the three holding walls of the cartridge, with the periphery of one apex of the triangle of the burr removing tip protruding and retracting from and into the outer peripheral surface of the tool main body being open. Thus, in the drilling tool disclosed in this publication, the tip cannot be attached or detached without completely drawing the burr removing tip out of the outer peripheral surface of the tool main body by, for example, detaching the cartridge, when replacing the burr removing tip. Thus, the tip cannot be replaced easily. Further, since three holding walls are thus formed in the cartridge, an increase in the size of the cartridge is inevitable.

In the drilling tool described in Japanese Patent Laid-Open No. 8-155716, the two side surfaces of the burr removing tip are constrained by the holding portion of the cartridge to fasten the burr removing tip, so that the tip can be replaced easily. However, in the drilling tool described in this publication, the portion of the holding portion of the cartridge holding the side surface positioned at the tool main body rear end of the burr removing tip is formed by the forward end edge of the strip like member forming the cartridge, so that, in this portion, the side surface of the burr removing tip is simply supported in line contact, and there is a danger of the mounting stability of the burr removing tip being impaired. In particular, this portion holding the side surface positioned at the tool main body rear end of the burr removing tip is the portion which receives the load applied to the burr removing tip when drilling by the drilling tool, so that, if the portion can only hold the burr removing tip in line contact, there is the danger of the burrs not being reliably removed.

Further, in the drilling tool disclosed in the above publication, the biasing member is a plate spring, a compression coil spring or a belleville spring as stated above, so that when it is necessary to increase the biasing force of this biasing member according to, for example, the machining condition, it is necessary to increase the thickness of the plate spring, increase the number of turns or the thickness of the compression coil spring, or increase the number of belleville springs. In any case, an increase in the distance between the cartridge movable portion and the bottom surface of the groove is inevitable. As a result, the groove accommodating the cartridge becomes deeper, and the tool main body is greatly cut out, so that, in particular, in a drilling tool for drilling small diameter holes, the rigidity of the tool is impaired and breakage, etc. occurs, or it may become impossible to form a groove capable of accommodating such a cartridge.

Further, in the above drilling tool, the burr removing tip in the form of a substantially equilateral-triangular flat plate is arranged so as to be parallel to the axis of the tool main body as seen from the tool rotating direction, with its triangular surface being directed toward the tool rotating direction as the scooping surface, and one corner portion of the triangular surface protruding toward the outer periphery of the tool, and the bottom side of the triangular surface opposed to this one corner portion protruding toward the outer periphery of the tool, that is, in the condition in which the burr removing tip has not been forced into the hole of the workpiece yet. However, when the burr removing tip is displaced toward the inner periphery of the tool by deforming the movable portion of the cartridge or rotating it around the pin as the burr removing tip is forced into the hole of the workpiece, the retraction into the groove is effected with the burr removing tip inclining so as to incline toward the inner periphery of the tool as the bottom side is changed from the position parallel to the axis toward the forward end of the tool. Thus, when getting the burr removing tip into the groove with the bottom side being thus inclined, it is necessary for the depth of the groove to be not less than the distance from the bottom side of the equilateral triangular surface to one corner portion, and, in the case of a small-diameter drilling tool, the rigidity of the tool is impaired or it is difficult to form the groove itself.

Further, in the above drilling tool, the movable portion of the cartridge is arranged so as to extend parallel to the axis of the tool main body, and, as a result, the groove accommodating the cartridge is also formed so as to extend parallel to the axis of the tool main body. However, when the chip discharge groove is twisted around the axis of the tool main body as in a twist drill, the land of the tool main body in which the groove is formed is similarly twisted around the axis. In particular, in a small diameter drilling tool or a drilling tool in which the twisting angle of the chip discharge groove is large as described above, the axial length of the land is also small. Thus, there is a limitation to the formation of a groove to extend parallel to the axis of the tool main body as described above, and it has been impossible to attach to such a drilling tool a cartridge of which the length of the movable portion is large.

SUMMARY OF THE INVENTION

The present invention has been made in view of the above problem. It is accordingly an object of the present invention to provide a drilling tool endowed with a burr removing function which makes it possible to replace the burr removing tip easily and which enables the burr removing tip to be held in a stable manner. Further, it is an object of the present invention to provide a drilling tool which performs burr removal and beveling of the hole by a burr removing tip protruding from and retracting into the outer periphery of the tool main body, wherein the size of the cartridge holding this burr removing tip is reduced, whereby, even in the case of a small diameter drilling tool, the cartridge can be attached, making it possible to perform the above burr removal and beveling.

In a first aspect of the present invention, there is provided a drilling tool including a tool main body having a cutting edge at the forward end, a groove provided in the peripheral surface of the forward end portion of the tool main body, a cartridge accommodated in the groove and capable of elastic deformation in the radial direction of the tool main body, and a burr removing tip in the form of a substantially triangular flat plate which is mounted to the cartridge so as to be capable of being attached to and detached from the cartridge and capable of protruding from and retracting into the peripheral surface of the tool main body by the elastic deformation of the cartridge, wherein there are provided two protection walls in plain contact with two of the three side surfaces corresponding to the three sides of the triangle formed by the burr removing tip, and wherein the burr removing tip is mounted to the cartridge such that the two side surfaces are in face contact with the two protection walls and that the remaining one side surface is left open.

Thus, in the drilling tool constructed as described above, the burr removing tip is mounted to the cartridge with the remaining one side surface being left open, so that it is possible to replace the burr removing tip by detaching it from the cartridge by extracting it to this one side surface side, without having to completely extract it from the outer peripheral surface of the tool main body. Further, since the burr removing tip is protected by two protection walls, it is possible to reduce the size of the cartridge. On the other hand, the two protection walls of the cartridge and the two side surfaces of the burr removing tip are in face contact with each other, it is possible to fasten the burr removing tip to the cartridge reliably and in a stable manner.

That is, in accordance with the present invention, only two of the side surfaces of the burr removing tip in the form of a triangular flat plate, its replacement can be easily conducted solely by extracting the burr removing tip to the remaining one side surface side without having to detach the cartridge, so that it is possible to reduce the requisite time and effort for the replacement even in the case in which the burr removing tip is frequently replaced, and it is possible to reduce the size of the cartridge. Further, since the burr removing tip is secured in position by holding these two side surfaces of the burr removing tip in face contact with the two protection walls of the cartridge, it is possible for the burr removing tip to be held in the cartridge safely and reliably.

Here, in the above burr removing tip, it is desirable that one apex of the above triangle formed by the burr removing tip be directed radially to the outer periphery of the tool main body and that the side surface opposed to this apex and the side surface positioned at the rear end of the tool main body be in face contact with the holding walls of the cartridge, whereby it is possible to reliably receive the load acting on the burr removing tip when forming a hole and hold the burr removing tip in a more stable manner.

Further, when the groove is formed so as to be open at the forward end of the tool main body, it is possible, in particular, to attach and detach the burr removing tip more easily when, as described above, the burr removing tip is mounted by holding the side surface opposed to the above-mentioned apex of the burr removing tip and the side surface positioned at the rear end of the tool main body in face contact with the holding walls of the cartridge. Conversely, when the above-mentioned groove is formed so as not to be open at the forward end of the tool main body, it is possible to improve the rigidity at the forward end portion of the tool main body, and it is possible to prevent chips generated by the cutting edge from entering this groove.

In a second aspect of the present invention, there is provided a drilling tool including a tool main body having a cutting edge at the forward end, and a burr removing tip held by a cartridge provided in this tool main body and elastically biased toward the outer periphery of the tool so as to be capable of protruding from and retracting into the outer periphery of the tool main body, wherein a torsion coil spring is used in the above cartridge as the biasing member for elastically biasing the burr removing tip. However, in such a torsion coil spring, a spirally wound coil undergoes elastic deformation by being twisted around the central axis to thereby generate a biasing force, and, compared, for example, with a compression coil spring, a larger biasing force is obtained if the wire diameter is the same. In other words, to obtain the same requisite biasing force, it is possible to reduce the wire diameter, coil diameter, number of turns, etc., whereby the size of the cartridge can be reduced, so that it is possible to prevent the groove for accommodating the cartridge from becoming too deep, making it possible to reliably secure the rigidity of the tool.

In a third aspect of the present invention, there is provided a drilling tool including a tool main body having a cutting edge at its forward end and adapted to rotate around an axis, and a burr removing tip held by a cartridge provided in this tool main body and elastically biased toward the outer periphery of the tool so as to be capable of protruding from and retracting into the outer periphery of the tool main body, wherein the burr removing tip is in the form of a substantially equilateral triangular flat plate, the equilateral triangular surface being directed toward the tool rotating direction as the scooping surface, and one corner portion of this equilateral triangular surface being positioned in the outer periphery of the tool, and wherein the burr removing tip is held such that the bottom side opposed to the above one corner portion of the equilateral triangular surface is substantially parallel to the axis as seen from the tool rotating direction, with the burr removing tip being within the outer periphery of the tool main body. Thus, in this drilling tool, it is only necessary for the depth of the groove for accommodating the burr removing tip to correspond to the height of the triangular surface serving as the scooping surface, that is, from the bottom side to the above one corner portion, with the burr removing tip being within the outer periphery surface of the tool main body, and there is no need for the groove to be deeper than that as in the prior art.

Further, in a fourth aspect of the present invention, there is provided a drilling tool including a tool main body having a cutting edge at its forward end, and a burr removing tip held by a cartridge provided in this tool main body and elastically biased toward the outer periphery of the tool so as to be capable of protruding from and retracting into the outer periphery of the tool main body, wherein there is provided in the cartridge a movable portion the rear end portion of which is supported by the tool main body and to the forward end portion of which the burr removing tip is mounted so that it can be displaced in the radial direction of the tool main body, the forward end portion and the rear end portion of this movable portion being deviated in the circumferential direction of the tool main body. Thus, in this drilling tool, even if the diameter of the drilling tool is small or the helix angle of the chip discharge groove is large, it is possible to reliably mount the cartridge to the land defined between the chip discharge grooves by deviating the forward end portion and the rear end portion of the movable portion from each other in the circumferential direction of the tool main body in accordance with the helix angle of the chip discharge grooves.

That is, in accordance with the present invention, there is provided a drilling tool including a tool main body having a cutting edge at its forward end, and a burr removing tip held by a cartridge provided in this tool main body and elastically biased toward the outer periphery of the tool so as to be capable of protruding from and retracting into the outer periphery of the tool main body, wherein a torsion coil spring is used as the biasing member for biasing the burr removing tip, wherein the forward end and the rear end of the movable portion of the cartridge are deviated from each other are the circumferential direction of the tool main body, and wherein the burr removing tip in the form of a substantially equilateral triangular flat plate is held such that the bottom side of the triangular surface opposed to the corner portion positioned on the outer periphery of the tool is substantially parallel to the axis of the tool main body as seen from the rotating direction of the tool, whereby the size of the cartridge is reduced and the groove for accommodating the cartridge is diminished in size. As a result, even in the case of a small diameter drilling tool, it is possible to prevent the rigidity of the tool main body from being impaired and prevent breakage thereof, making it possible to perform burr removal and beveling in a stable manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
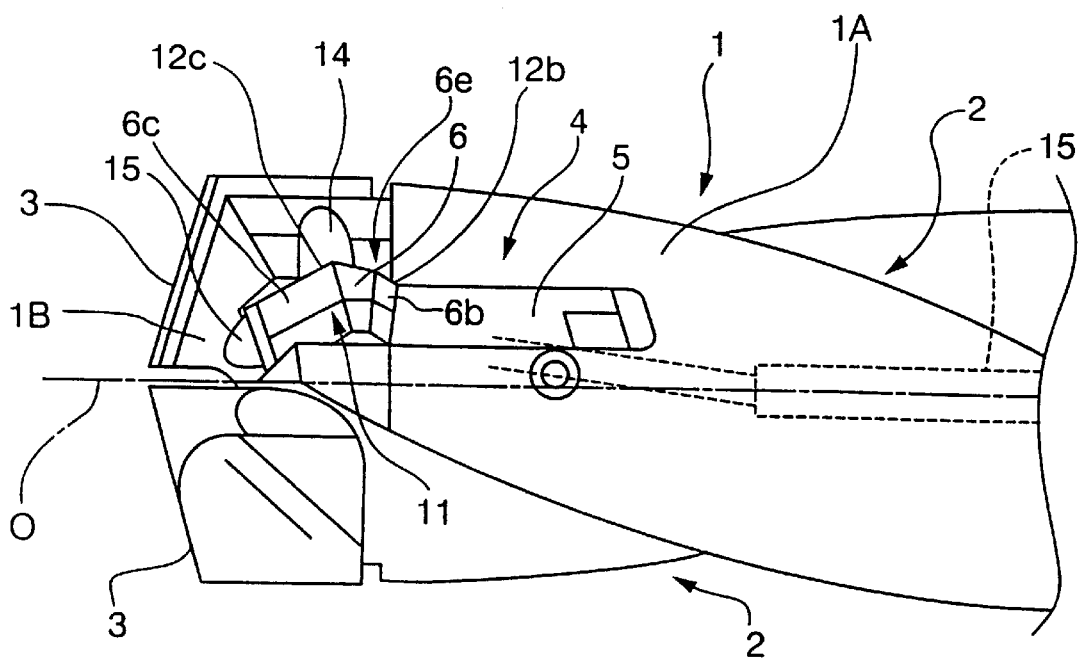
FIG. 1 is a side view of the forward end portion of a tool main body 1 of a drilling tool according to a first embodiment of the present invention.
Figure 2:
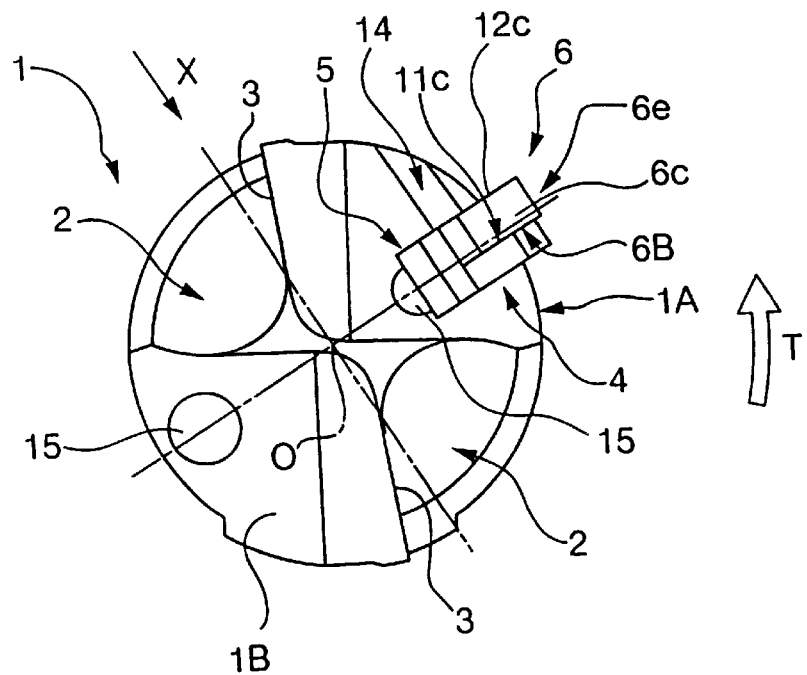
FIG. 2 is a front view of the first embodiment of FIG. 1 as seen from the side of the forward end surface 1B.
Figure 3:
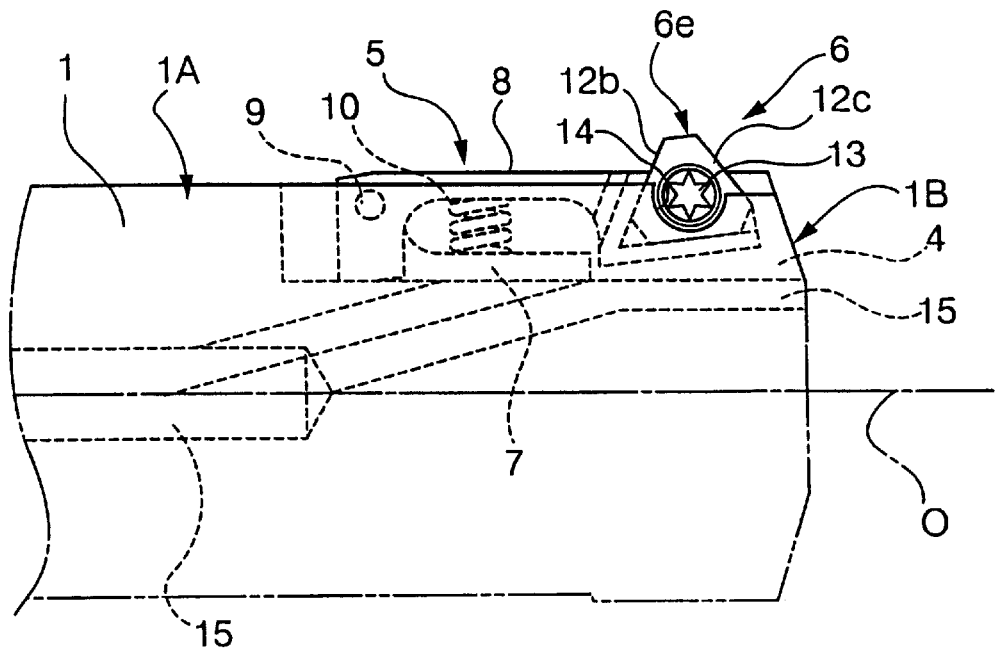
FIG. 3 is a partial side view of FIG. 2 as seen from the direction of the arrow X.

FIGS. 1 through 4 show the first embodiment of the present invention. In this embodiment, the forward end portion of the tool main body 1 is substantially cylindrical, and, on the outer peripheral surface 1A of this forward end portion, there are formed a pair of chip discharge grooves 2 twisted from the forward end surface 1B to the rear end toward the rear side of the tool rotating direction T. In the forward end portion of the wall surface of these chip discharge grooves 2, cutting edge tips are joined to provide cutting edges 3. In the outer peripheral surface 1A of one of the lands defined between the chip discharge grooves 2 in the circumferential direction of the tool main body 1, there is formed a groove 4 open at the forward end surface 1B of the tool main body 11 and extending along the axis O of the tool main body 1. This groove 4 accommodates a cartridge 5, and a burr removing tip 6 is detachably attached to the forward end portion of this cartridge 5.

Figure 4:
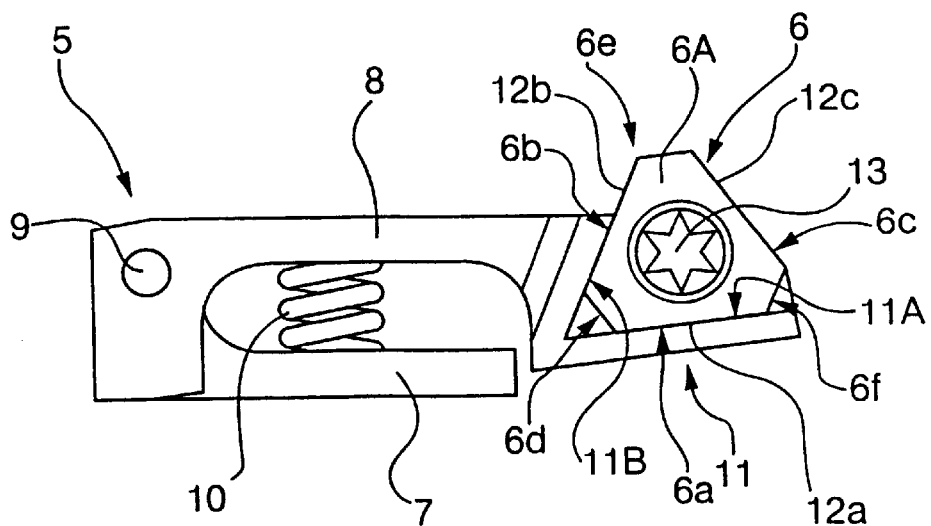
FIG. 4 is a side view of a cartridge 5 of the first embodiment shown in FIG. 1.

Here, as shown in FIG. 4, the cartridge 5 is equipped with a base 7 secured to the bottom portion of the groove 4, and a movable arm 8 accommodated on the outer peripheral side of the groove 4. The rear end portion of this movable arm 8 is rotatably connected to the rear end portion of the base 7 through the intermediation of a pin 9, and, between the movable arm 8 and the base 7, there is provided a spring (coil spring) 10 serving as the elastic member, by means of which the movable arm 8 is biased radially toward the outer periphery of the tool main body 1. Thus, with the entire cartridge 5 being accommodated in the groove 4, the forward end portion of the movable arm 8 is capable of elastic displacement in the radial direction of the tool main body 1 in the groove 4 around the pin 9.

In the forward end portion of the movable arm 8, there is formed a tip holding portion 11 including a pair of holding walls 11A and 11B opened in a V-shaped configuration at an angle of 60 degrees toward the forward end and a tip mounting surface 11C directed toward the tool rotating direction T with the cartridge 5 being attached to the tool main body 1. Here, one holding wall 11A is arranged so as to be directed toward the outer periphery of the tool main body 1 with the cartridge 5 being mounted to the groove 4, and the other holding wall 11B is arranged so as to be directed toward the outer periphery as it extends toward the forward end. Further, the tip mounting surface 11C has a screw hole (not shown).

In this embodiment, the burr removing tip 6 is a positive throw away tip in the form of a substantially equilateral triangular flat plate formed of a hard material such as hard metal and has upper and lower surfaces 6A and 6B substantially in the form of an equilateral triangle and three side surfaces 6a, 6b and 6c connected to the three sides of the upper and lower surfaces 6A and 6B, beveling being performed on the three apex portions where the adjacent side surfaces 6a, 6b and 6c cross each other. Further, at the ridges where the upper surface 6A and the three side surfaces 6a, 6b and 6c intersect each other, there are burr removing edges 12a, 12b and 12c.

The burr removing tip 6 constructed as described above is seated on the tip holding portion 11 of the cartridge 5 as follows: the upper surface 6A serving as the scooping surface is directed toward the tool rotating direction T, and the lower surface 6B is held in close contact with the tip mounting surface 11C, and the side surface 6a directed toward the inner periphery of the tool main body 1 is held in face contact with the holding wall 11A and the side surface 6b directed toward the rear end of the tool main body 1 is held in face contact with the holding wall 11B. Further, a clamp screw 13 passed from the upper surface 6A is screwed into the screw hole of the tip mounting surface 11C, whereby the burr removing tip is fastened to the cartridge 5. In this condition, the burr removing tip 6 is positioned on the rear end side of the cutting edges 3 with respect to the axis O of the tool main body 1, and one of the apex portions 6d through 6f (which is 6e in this embodiment) protrudes from the outer peripheral surface 1A of the tool main body 1, and the cutting edges 12b and 12c on either side of the apex portion 6e are inclined with respect to the axis O. Further, the above apex portion 6e can protrude from and retract into the outer peripheral surface 1A of the tool main body 1 as the movable arm 8 of the cartridge 5 is enabled to elastically displace in the radial direction of the tool main body 1.

Further, in the outer peripheral surface 1A of the tool main body 1, there is formed a slit 14 having a round section and communicating with the above groove 4 so as to extend from the position facing the head portion of the clamp screw 13 in the tangential direction of the outer peripheral surface 1A in the section crossing the axis O at right angles in the condition in which the above apex portion 6e protrudes from the outer peripheral surface 1A, and, by inserting an operating tool such as a wrench or driver into this slit 14, the attachment and detachment of the burr removing tip 6 through the fastening and loosening of the clamp screw 13 can be effected more easily. Further, inside the tool main body 1, there is formed a cutting fluid supplying hole 15 along the axis O. This supplying hole 15 is branched into two portions at the forward end of the tool main body 1. One portion is open straight at the forward end surface 1B of the tool main body 1, and the other portion is open at the bottom surface of the groove 4, and then bent along this bottom surface so as to be open in a sem-circular fashion at the forward end surface 1B of the tool main body 1.

In drilling operation by this drilling tool constructed as described above, burrs generated at the opening of the hole formed in the workpiece by the cutting edges 3 are removed by the cutting edge 12c of the burr removing tip 6 directed toward the forward end of the tool main body 1 when the burr removing tip 6 comes into contact with the peripheral edge of the opening of the hole after the cutting edges 3 as the tool main body 1 is fed. When the tool main body 1 is further fed forward in the direction of the axis O, and the burr removing tip 6 is inserted through the hole, the burr removing tip 6 gets within the tool main body 1 through elastic displacement of the movable arm 8 of the cartridge 5. When the cutting edges 3 are passed through the workpiece and the burr removing tip 6 gets out of the hole, the burr removing tip protrudes again from the outer peripheral surface 1A of the tool main body 1 through the above elastic displacement, so that, by retracting the tool main body 1 when extracting the tool main body 1 from the hole, the burrs generated at the through-hole opening of the hole are removed by the cutting edge 12b of the burr removing tip 6 directed toward the rear end of the tool main body 1.

In the drilling tool constructed as described above, the burr removing tip 6 in the form of a triangular flat plate is held by the tip holding portion 11 of the cartridge 5, with the two side surfaces 6a and 6b of the three side surfaces 6a through 6c being in face contact with the holding walls 11A and 11B, and the remaining side surface 6c is open at the forward end of the tool main body 1, so that when the burr removing tip 6 is replaced or the burr removing tip 6 is rotated and re-mounted to replace the cutting edges 12a through 12c, the burr removing tip 6 can be easily detached from the tip holding portion 11 to the forward end of the tool main body 1. Thus, when performing tip replacement, etc., there is no need to detach thee cartridge 5 from the tool main body 1 or completely extract the burr removing tip 6 from the outer peripheral surface 1A of the tool main body 1, whereby it is possible to reduce the time and effort required for the replacement of the tip, etc. Further, since only two holding grooves 11A and 11B are formed in the tip holding portion 11, it is possible to reduce the size of the cartridge 5. Thus, the groove 4 can be made shorter, whereby the rigidity of the tool main body 1 can be improved.

On the other hand, as described above, the burr removing tip 6 is held with its two side surfaces 6a and 6b being in face contact with the holding walls 11A and 11B of the tip holding portion 11, so that the contact area between the burr removing tip 6 and the tip holding portion 5 is secured, and it is possible to firmly hold the burr removing tip 6 against the load applied when performing drilling, making it possible to perform machining in a stable manner. In particular, when the burr removing tip 6 removes burrs on the peripheral edge of the opening of the hole, a large load is applied to the burr removing tip 6 toward the rear end in the direction of the axis O as the tool main body 1 is fed forward in the direction of the axis O. In the drilling hole of this embodiment, the holding wall 11B of the tip holding portion 11 is in face contact with the side surface 6b positioned at the rear end side of the tool main body 1, so that the above load can be reliably received. Furthermore, the holding walls 11A and 11B of the tip holding portion 11 are open at the forward end in a V-shaped configuration, so that when a load is applied to the burr removing tip 6 rearward in the direction of the axis O, the burr removing tip 6 is forced into the gap between the holding walls 11A and 11B like a wedge, so that it is possible to secure further stability in mounting.

Further, in this embodiment, the groove 4 accommodating the cartridge 5 is formed so as to be open at the forward end surface 1B of the tool main body 1, so that when, in particular, the holding walls 11A and 11B of the tip holding portion 5 are formed in a V-shaped configuration open at the forward end of the tool main body 1, it is possible to extract the burr removing tip 6 detached from the tip holding portion 11 at the time of tip replacement, etc. to the forward end side, further facilitating the tip replacement, etc. Further, when the groove 4 is open at the forward end surface 1B, it is possible to utilize this groove 4 as a part of the cutting fluid supply hole 15, making it possible to smoothly supply cutting fluid to the cutting edges 3 and to the burr removing tip 6.

Figure 5:
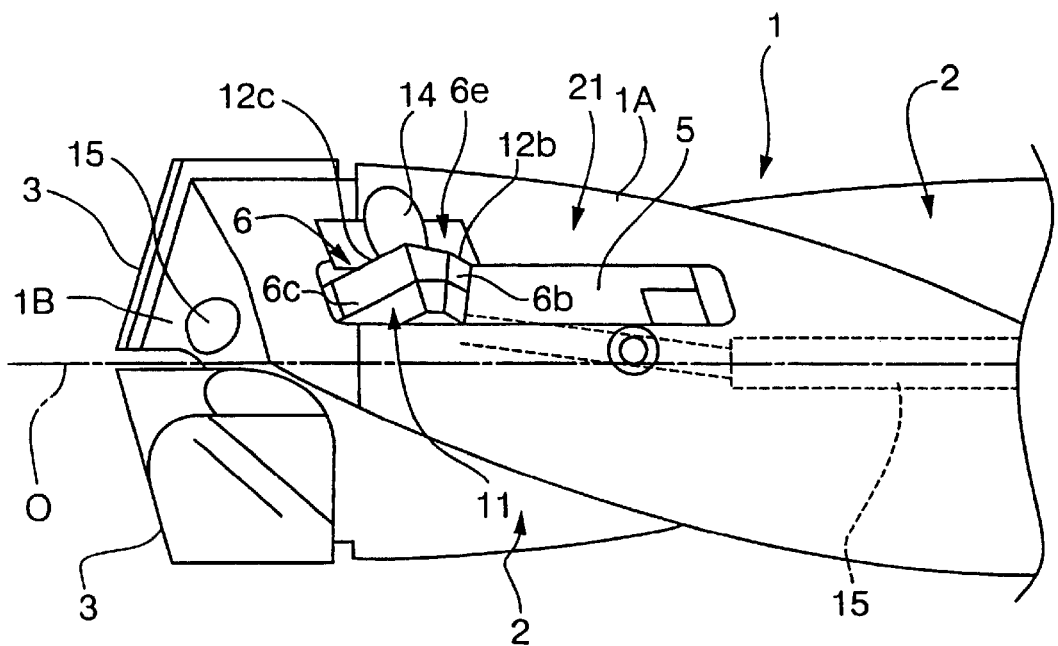
FIG. 5 is a side view of the forward end portion of the tool main body 1 of a second embodiment of the present invention.
Figure 6:
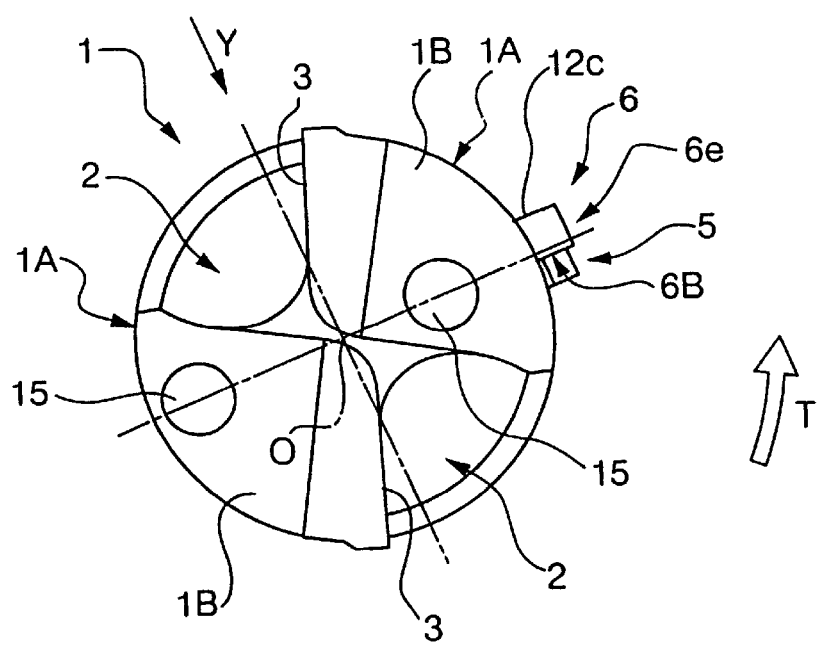
FIG. 6 is a front view of the second embodiment of FIG. 5 as seen from the side of the forward end surface 1B.
Figure 7:
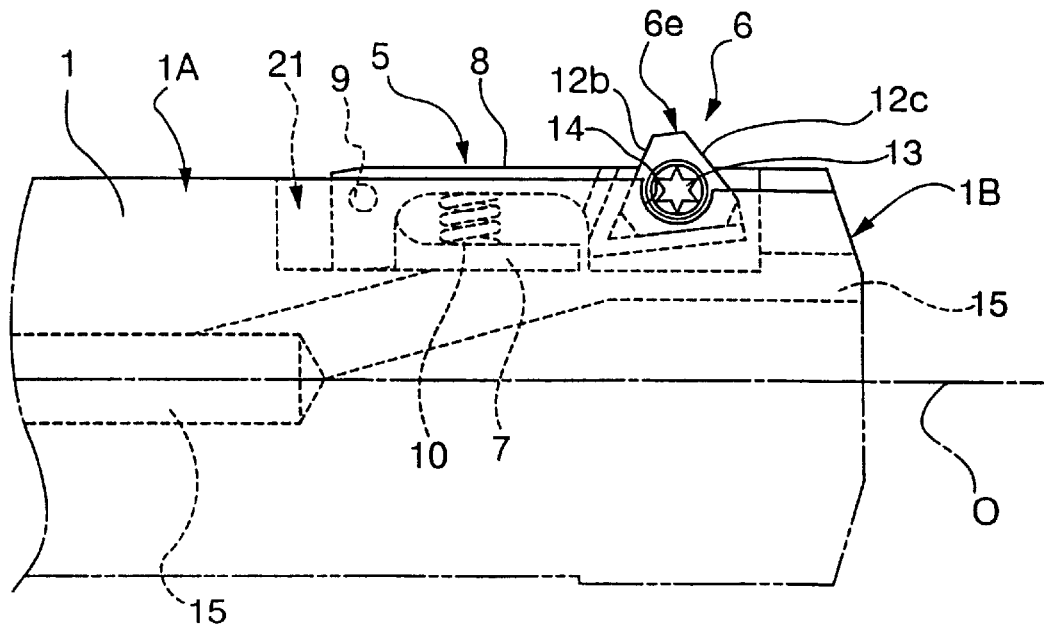
FIG. 7 is a partial side view of FIG. 6 as seen from the direction of the arrow Y.
Figure 8:
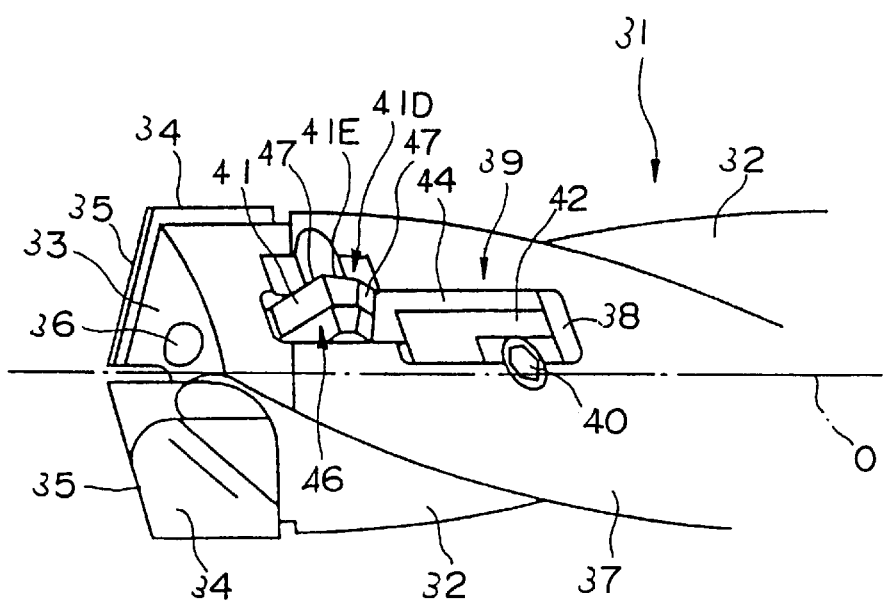
FIG. 8 is a side view of the forward end portion of a tool main body 31 of a drilling tool according to a third embodiment of the present invention.
Figure 9:
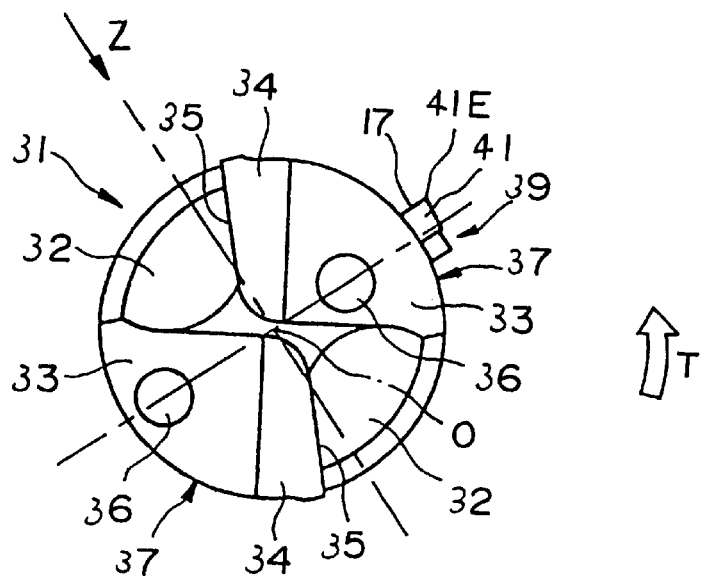
FIG. 9 is a front view of the embodiment of the tool of the embodiment of FIG. 8 as seen from the side of the forward end of the tool.

While in this embodiment the groove 4 is open at the forward end surface 1B, it is also possible, as in the case, for example, of the second embodiment shown in FIGS. 5 through 7, to form the groove 21 so as not to be open at the forward end surface 1B but to extend from a position spaced apart from the forward end surface 1B rearward in the direction of the axis O of the tool main body 1. However, in this second embodiment shown in FIGS. 5 through 7, the components other than the groove 21 have the same construction as those of the first embodiment shown in FIGS. 1 through 4, so that the components common to the first and second embodiments are indicated by the same reference numerals and a description thereof is omitted.

In the drilling tool of the second embodiment in which the groove 21 is formed so as not to be open at the forward end surface 1B of the tool main body 1, the forward end surface 1B of the tool main body 1 is not cut away by the groove on the rear side of the tool rotating direction T of the cutting edge 3, so that it is possible to improve the rigidity of the tool, and, regarding the large load applied to the cutting edge 3 at the time of drilling, it is possible to prevent breakage from occurring to the tool main body 1. Further, since the groove 21 is not open at the forward end surface 1B, the chips generated by the cutting edges 3 do not enter the groove 21, and there is no danger of the operation of the cartridge 5 being hindered by the intrusion of the chips to make it impossible for the burr removing tip 6 to protrude and retract smoothly.

Next, FIGS. 8 through 12 show the third embodiment of the present invention. In this embodiment, the outer configuration of the tool main body 31 is substantially cylindrical, and, in the outer periphery of the forward end portion thereof, there are formed a pair of chip discharge grooves 32 which are twisted rearward in the tool rotating direction T they extend toward the rear end of the tool along the axis O and which are open at the forward end surface 33 of the tool main body 31 to extend to the rear end, and, to the forward ends of the wall surfaces of these chip discharge grooves 32, cutting edge tips 34 formed of a hard material such as hard metal are attached by brazing, and cutting edges 35 for forming a hole in the workpiece are formed at the forward ends of these cutting edge tips 34. In the tool main body 31, a supply hole for cutting fluid are formed so as to extend from the rear end of the tool toward the forward end along the axis O. This supply hole 36 is branched into two portions at the forward end of the tool and extend parallel to the axis to be open at the forward end surface portions 33 connected to the rear side with respect to the tool rotating direction T of the cutting edges 35.

In one of a pair of lands 37 defined between the chip discharge grooves 32 in the circumferential direction of the tool main body 31, there is formed a groove 38 extending from a position slightly spaced apart rearward from the forward end surface 33 along the axis O toward the rear end of the tool, and a cartridge 39 is accommodated in this groove 38 and fastened by a clamp screw 40, and a burr removing tip 41 for removing burrs on the peripheral edge of the opening of the hole and beveling is held by this cartridge 39. Of the supply holes 36 branched in the forward end portion of the tool, the supply hole 36 extending to the land 37 where the groove 38 is formed is formed such that the outer peripheral portion of the tool is open at the portion at the tool forward end of the bottom surface 38 of the groove 38 and communicate with the groove 38.

Figure 10:
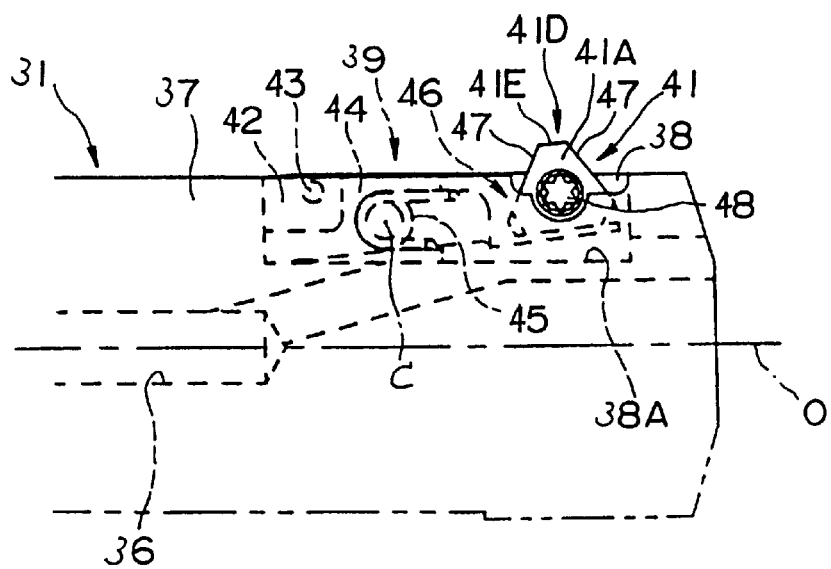
FIG. 10 is a side view of FIG. 9 as seen from the direction of the arrow Z.
Figure 11:
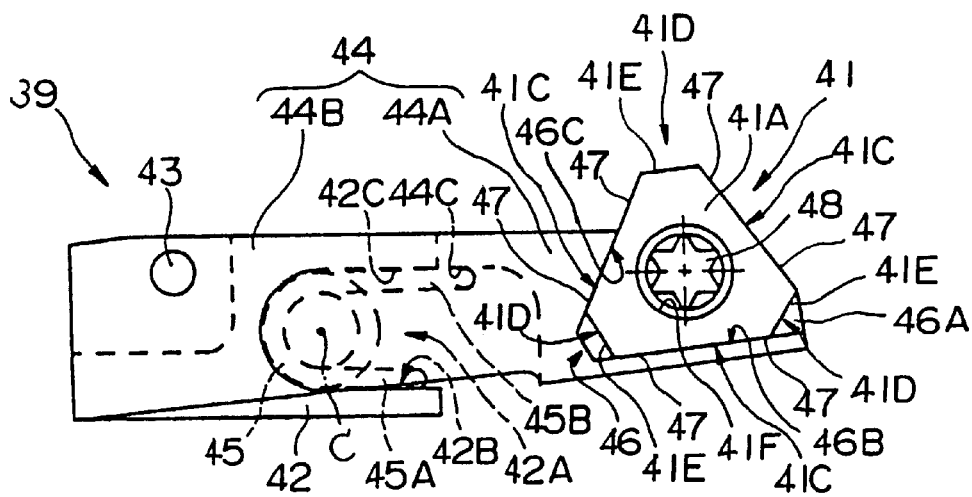
FIG. 11 is a side view of a cartridge 39 attached to the drilling tool of the embodiment shown in FIG. 8.
Figure 12:
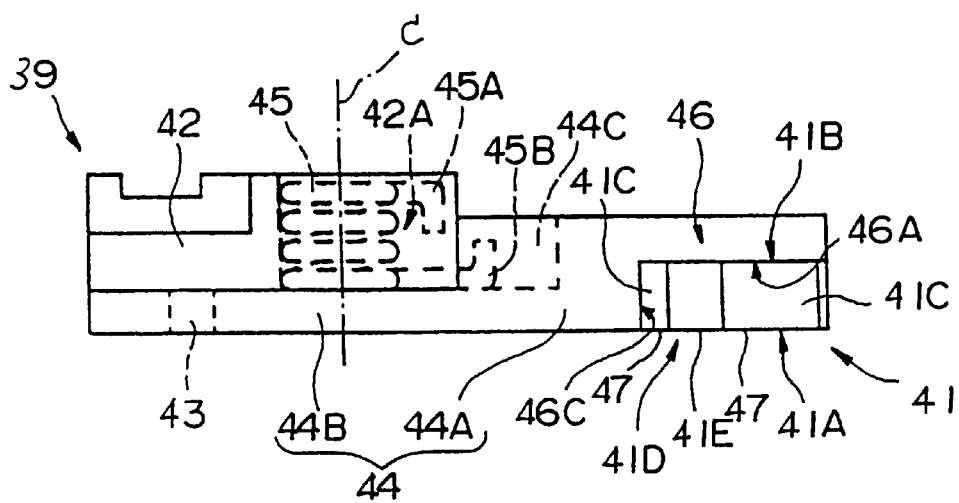
FIG. 12 is a plan view of the cartridge 39 shown in FIG. 11.

As shown in FIGS. 10 through 12, in this embodiment, the cartridge 39 comprises a stationary portion 12 fixed to the tool rear end side of the groove 38 by the clamp screw 10, a movable portion 44 rotatably mounted to the stationary portion 42 through the intermediation of a pin 43, and a torsion coil spring 45 mounted to the stationary portion 42 to be engaged with the movable portion 44 and serving as a biasing member for biasing the burr removing tip 41 toward the outer periphery of the tool. Here, in the surface of the stationary portion 42 facing the tool forward end, there is formed a recess 42 having a U-shaped section, and the torsion coil spring 45 is accommodated in the recess 42A such that the torsion central axis C extends in the tangential direction of the circle whose center is the axis O, and one end portion 45B thereof abuts the bottom surface 42B of the recess 42A, and the other end portion 45B abuts the top surface 42C of the recess 42A, and the forward end of this other end portion 45B protrudes from the recess 42A and is mounted to the stationary portion 42.

Further, in this embodiment, the movable portion 44 includes a forward end portion 44A positioned at the forward end of the stationary portion 42 and having a tip mounting seat 46 for attaching the burr removing tip 41, and a rear end portion 44B extending straight along the side surface of the stationary portion 42 in a direction perpendicular to the central axis C. This rear end portion 44B is mounted to the stationary portion 42 through the intermediation of a pin 43 extending parallel to the central axis C, and is made rotatable in a plane including the axis O of the tool main body 31 around this pin 43, whereby the forward end portion 44A can be displaced in the radial direction of the tool main body 31. When the forward end portion 44A of this movable portion 44 is rotated to the outer periphery of the tool, the burr removing tip 41 protrudes to the outer periphery of the land 37 of the tool main body 1 as shown in FIG. 10, and, when the forward end portion 44A rotates to the inner periphery of the tool, it gets within the groove 38, that is it can protrude from and retract into the outer periphery of the tool main body 31.

Further, as shown in FIGS. 10 and 11, on the rear end side of the forward end portion 44A of the movable portion 44, there is formed an abutment surface 44C which is flush with the to surface 42C of the recess 42A of the stationary portion 42 with the burr removing tip 41 protruding to the outer periphery of the tool main body 31, and which can abut the other end portion 45B of the torsion coil spring 45 protruding from the recess 42A. And from the condition in which the top surface 42C and the abutment surface 44C are arranged so as to be flush with each other in which the burr removing tip 41 protrudes to the outer periphery of the tool main body 31, the forward end portion 44A of the movable portion 44 rotates to the inner periphery of the tool and the burr removing tip 41 gets within the groove 38, whereby the abutment surface 44C engages in this rotating direction with the forward end of the other end portion 45B of the torsion coil spring 45, and the torsion coil spring 45 is twisted around the central axis C to undergo elastic deformation, and, by the elastic force, the movable portion 44 itself is pressurized in a direction opposite to the rotating direction, whereby the burr removing tip 41 is elastically biased to the outer periphery of the tool.

Further, the tip mounting seat 46 which is formed in the forward end portion 44A of the movable portion 44 and to which the burr removing tip 41 is attached is substantially defined by a bottom surface 46A formed in a direction perpendicular to the central axis C and directed in the tool rotating direction T, a wall surface 46B raised from the peripheral edge of this bottom surface 46A and directed toward the outer periphery of the tool and a short wall surface 46C directed to the forward end of the tool and, in the bottom surface 46A, a clamp screw hole (not shown) is formed so as to be perpendicular to the bottom surface 46A, and the wall surfaces 46B and 46C are formed in a direction crossing it at an angle of 60 degrees as seen from a direction opposed to the bottom surface 46A. Here, the wall surface 46B is arranged so as to be slightly inclined toward the inner periphery of the tool as it extends to the rear end of the tool as shown in FIGS. 10 and 11, with the abutment surface 44C of the movable portion 44 being flush with the top surface 42C of the stationary portion 42 and the burr removing tip 41 protruding, and is formed so as to be parallel to the axis O of the tool main body 31 as seen from the tool rotating direction T in the condition in which the movable portion 44 rotates toward the inner periphery of the tool and the burr removing tip 41 gets within the groove 38.

In this embodiment, the burr removing tip 41 attached to tip mounting seat 46 is a positive throw away tip one of the equilateral triangular surface 41A serves as the scooping surface and the other equilateral triangular surface 41B serves as the seating surface. Further, the three side surfaces 41C arranged around these equilateral triangular surfaces 41A and 41B serve as flanks, and the cutting edges (burr removing edges) 47 for cutting the peripheral edge of the opening of the hole formed in the workpiece by the cutting edges 35 are formed at the intersection ridge portions of the side surfaces 41C and the equilateral triangular surface 41A. However, at the corner portions 41D of the equilateral triangular surface 41A of this burr removing tip 41, there are formed beveled portions 41E by cutting the intersection ridge portions of the adjacent side surfaces 41C over the equilateral triangular surfaces 41A and 41B parallel to the cutting edges 47 opposed to the corner portions 41D, so that, strictly speaking, the burr removing tip 41 of this embodiment is in the form of an unsymmetrical hexagon flat plate in which the longer and shorter sides on which the cutting edges 47 are formed are alternately arranged. At the center of the equilateral triangular surfaces 41A and 41B of this burr removing tip 41, there is formed a mounting hole 41F.

In this burr removing tip 41, the equilateral triangular surface 41A serving as the scooping surface is directed toward the tool rotating direction T, and the equilateral triangular surface 41B serving as the seating surface is held in close contact with the bottom surface 46A, and the pair of side surfaces 41C abut the wall surfaces 46B and 46C and one corner portion 41D opposed to the cutting edge 47 formed on the side surface 41C side abutting the wall surface 46B is positioned in the outer periphery of the tool, and, in this way, the burr removing tip is seated on the tip mounting seat 46. Further, by screwing the clamp screw 48 inserted into the mounting hole 41F in the clamp screw hole of the bottom surface 46A, it is secured to the cartridge 39 and held thereby. Thus, in this burr removing tip 41, this one corner portion 41D protrudes to the outer periphery of the tool, with the top surface 42C being flush with the abutment surface 44C, and the pair of cutting edges 47 intersecting this one corner portion 41D are arranged so as to be inclined toward the inner periphery of the tool as they extend toward the forward end of the tool and the rear end of the tool to be used to cut the peripheral edge of the opening.

In this drilling tool, constructed as described above, the tool main body 31 is fed toward the forward end of the tool while rotating it around the axis O, with one corner portion 41D of the burr removing tip 41 protruding to the outer periphery of the tool main body 1, whereby a hole is formed in the workpiece by the cutting edges 35, and then the burr removing tip 41 comes into contact with the peripheral edge of the opening of this hole as the tool main body 31 is fed. Then, burr removal, beveling, etc. are conducted on the peripheral edge of the opening by the inclined cutting edge 47 directed toward the forward end of the tool. And, when the tool main body 31 is further fed, the burr removing tip 41 is guided by the inclination of this cutting edge 47 and pressed against the inner periphery of the tool to get within the groove 38, and the drilling of the tool is effected solely by the cutting edges 35. At this time, in the burr removing tip 41, as the cutting edge 47 opposed to the above one corner portion 41D is arranged parallel to the axis O of the tool main body 31 as described above, the beveled portion 41E formed in the one corner portion 41D so as to be parallel to this cutting edge 47 is also arranged parallel to the axis O, so that despite the fact that it is biased toward the outer periphery of the tool by the torsion coil spring 35, this beveled portion 41E comes into slide contact without being engaged in the inner periphery of the hole formed by the cutting edges 35.

Further, when the tool main body 31 is fed toward the forward end of the tool and the cutting edges 35 pass through the workpiece, and the burr removing tip 41 comes out of the opening of the through-hole, the one corner portion 41D of the burr removing tip 41 protrudes to the outer periphery of the tool main body 31 again by the biasing of the torsion coil spring 45. And when the tool main body 31 is drawn back toward the rear end of the tool, the inclined cutting edge 47 of the burr removing tip 41 directed toward the rear end of the tool comes into contact with the peripheral edge of the opening of the hole of the workpiece, and burr removal, beveling, etc. are conducted on the peripheral edge of the opening. When the tool main body 31 is further drawn back, the burr removing tip 41 is guided by the inclination of the cutting edge 47 directed to the rear end of the tool as described above and gets within the groove 38, so that, in the above-described drilling tool, by extracting the tool main body 31 from the hole as it is, it is possible to form a machined hole in which burr removal and beveling are performed on the peripheral edge of the opening on the obverse and reverse sides of the workpiece through one reciprocation of the tool main body 1.

Figure 13:
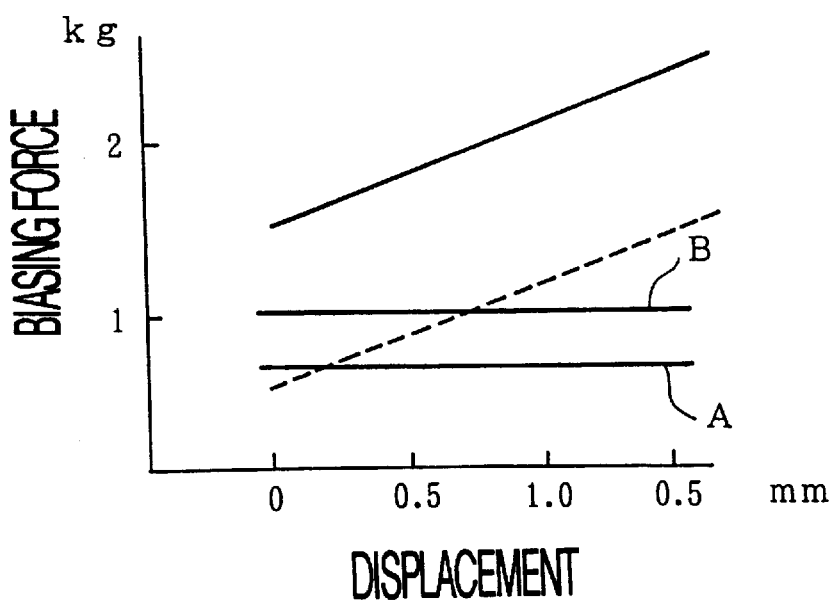
FIG. 13 is a diagram showing the relationship between displacement of the movable portion 44 and biasing force in the cartridge 39 using a torsion coil spring 45 and a cartridge using a compression coil spring.
Figure 14:
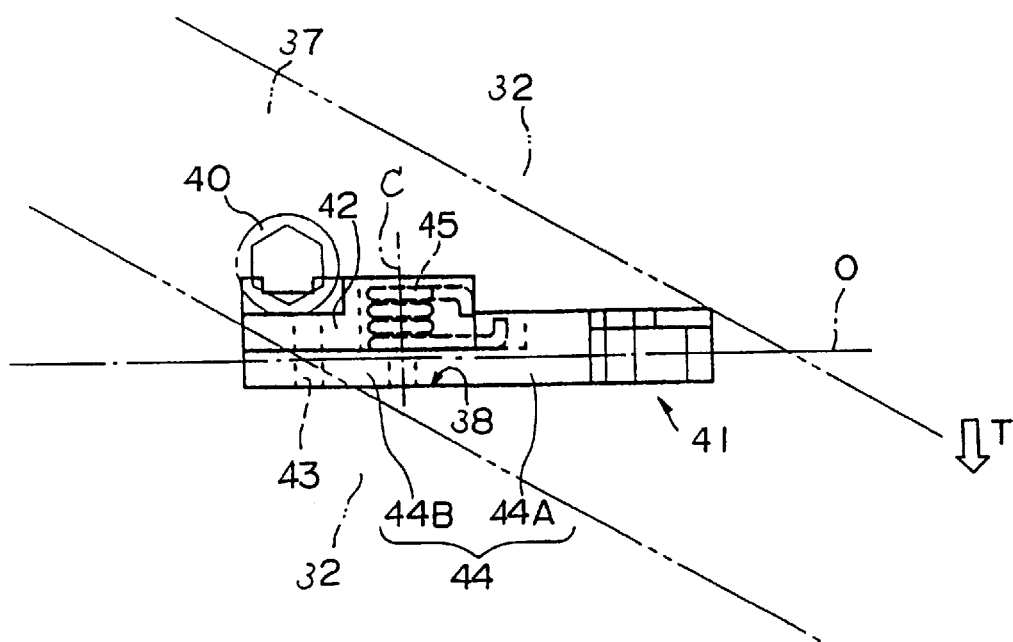
FIG. 14 is a development of the outer periphery of the tool main body 31 showing the portion around the cartridge 39 of the drilling tool of the third embodiment shown in FIG. 8.

However, in the drilling tool of this embodiment, the torsion coil spring 45 is used as the biasing member for biasing the burr removing tip 41 toward the outer periphery of the tool. This torsion coil spring 45 provides, compared with the conventional compression coil spring, etc., a greater biasing force when the coil wire diameter, the coil outer diameter or the number of turns is the same. For example, FIG. 13 shows the relationship between the displacement of the movable portion 44 of the cartridge 39 in the radial direction of the tool main body 31 and the biasing force toward the outer periphery of the tool at that time when a torsion coil spring and a compression coil spring having the same wire diameter, the same coil diameter and the same number of turns are used as the biasing members. The solid line represents the torsion coil spring, and the broken line represents the compression coil spring. As shown in this FIG. 13, even when the wire diameter, the coil diameter and the number of turns are the same, the torsion coil spring of this embodiment provides substantially double the biasing force as compared with the conventional compression coil spring.

And, with the above-described drilling tool equipped with the torsion coil spring 45, which thus provides a large biasing force, it is possible to bring the burr removing tip 41 into contact with the peripheral edge of the opening with a large pressurizing force, whereby it is possible to perform burr removal and beveling in a more reliable manner. In FIG. 13, symbol A indicates the biasing force required when performing burr removal and beveling when the cutting edge 47 of the burr removing tip 41 is not worn, and symbol B indicates the biasing force required when the cutting edge 47 is worn. In the case of the compression coil spring, the requisite biasing force cannot be met without displacing the movable portion 44 to some degree even when the cutting edge 47 is not worn. Thus, to secure this displacement, the groove 38 has to be formed deep, whereas, in the case of the torsion coil spring 45, the requisite biasing force can be obtained through a very small displacement even when the burr removing tip 41 is worn with the same wire diameter, the same coil diameter and the same number of turns.

In this way, in the drilling tool of this embodiment adopting the torsion coil spring 45, it is possible to obtain a larger biasing force with a coil spring of the same size. In other words, it is possible to obtain the same biasing force with a smaller wire diameter, coil diameter, and number of turns, whereby the size of the cartridge 39 can be reduced, making it possible to make the groove 38 accommodating the cartridge 39 shallow. Thus, in this embodiment, even when the drilling tool is a small diameter drilling tool, it is possible to prevent the rigidity of the tool main body 31 from being impaired to prevent generation of breakage, etc., making it possible to perform burr removal and beveling in a stable manner.

Further, in this embodiment, the cutting edge 47 formed in the bottom side of the equilateral triangular surface 41A opposed to the one corner portion 41D protruding toward the outer periphery of the tool, is arranged so as to be parallel to the axis O of the tool main body 31 as seen from the tool rotating direction T, with the burr removing tip 41 in the form of a substantially equilateral triangular flat plate being within the groove 38. In this respect, in the conventional drilling tool, the bottom side is parallel to the axis of the tool main body, with the burr removing tip protruding to the outer periphery of the tool, so that in the condition in which the burr removing tip is within the groove, this bottom side is inclined. To accommodate the burr removing tip in such a condition, the depth of the groove must be larger than the height as measured from the bottom side to the one corner portion of the burr removing tip. In contrast, in the drilling tool of this embodiment, the bottom side is parallel to the axis O, with the burr removing tip 41 being within the groove 38, so that it is only necessary for the depth of the groove 38 for accommodating the burr removing tip 41 to correspond to the height of the equilateral triangular surface 41A as measured from the bottom side to the one corner portion 41D, so that the depth of the groove 38 can be made smaller. Thus, it is possible to further ensure the rigidity of the tool main body 31, and even in the case of a small diameter drilling tool, it is possible to more reliably prevent generation of breakage, etc.

Further, in this embodiment, the beveled portion 41E is formed at the corner portion 41D of the burr removing tip 41, whereby it is possible to further diminish the depth of the groove 38. Further, as described above, when the burr removing tip 41 gets within the groove 38, this beveled portion 41E comes into slide contact with the inner periphery of the hole to thereby prevent the burr removing tip 41 from engaging in the inner periphery, whereby it is possible to improve the finish accuracy of the hole. While in this embodiment the torsion coil spring 45 is used as the biasing member in the cartridge 39, the construction in which the bottom side opposed to one corner portion 41D of the equilateral triangular surface 41A is substantially parallel to the axis O as seen from the tool rotating direction T, with the burr removing tip 41 being within the outer periphery of the tool main body 31, can also be applied to a drilling tool using a compression coil spring, a plate spring, or a belleville spring as the biasing member, and the same effect can be achieved in that case.

On the other hand, in this embodiment the chip discharge grooves 32 are so as to be twisted around the axis O, so that the land 37 to which the cartridge 39 is mounted is also formed so as to be twisted, whereas the groove 38 is formed so as to be parallel to the axis O, and the cartridge 39 is also formed such that the movable portion 44 thereof extends straight so as to be parallel to the axis O. However, when, for example, as in the case of a small diameter drilling tool, the length of the land 37 in the direction of the axis O cannot be made large, or when the angle of twist of the chip discharge grooves 32 is large, the groove 38 and the cartridge 39 extend beyond the land 37, and there is a danger of the requisite length for the movable portion 44 of the cartridge 39 not being secured.

Figure 15:
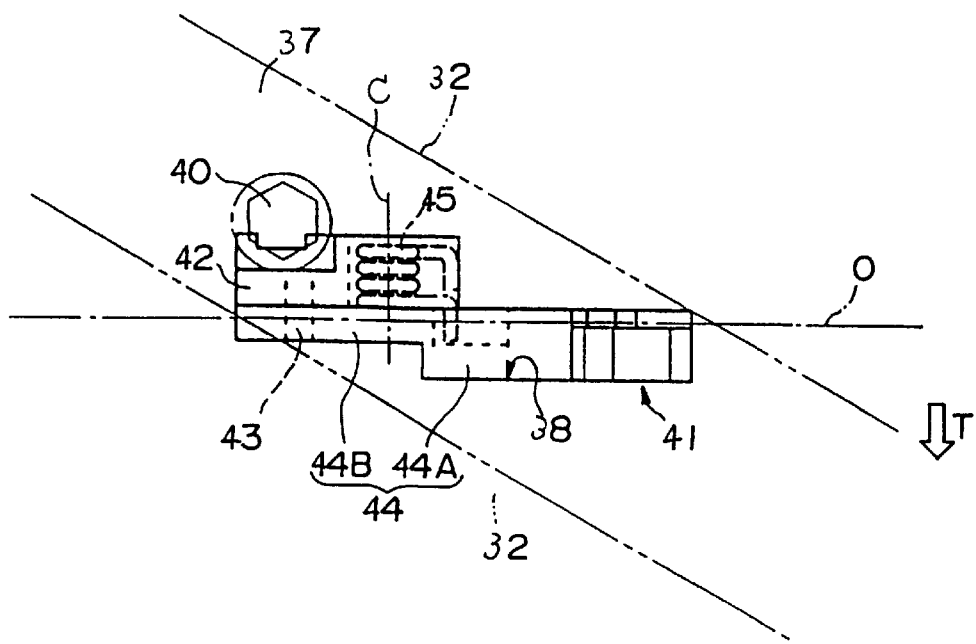
FIG. 15 is a development of the outer periphery of the tool main body 31 showing the portion around the cartridge 39 of the drilling tool of the fourth embodiment of the present invention.
Figure 16:
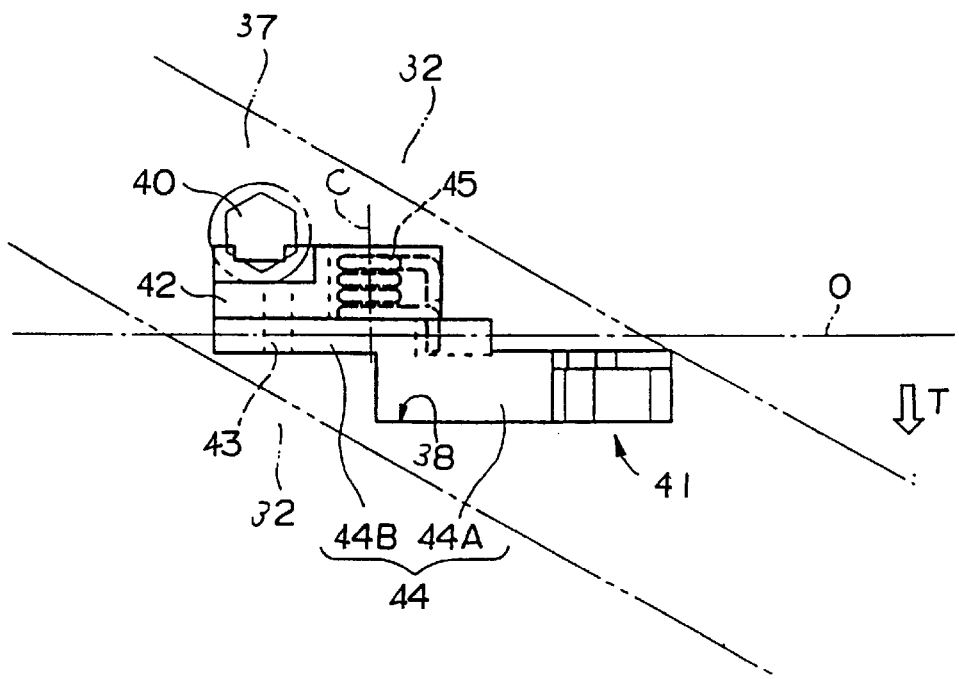
FIG. 16 is a development of the outer periphery of the tool main body 31 showing the portion around the cartridge 39 of the drilling tool of the fifth embodiment of the present invention.

In such a case, as in the fourth embodiment of the present invention shown in FIG. 15 or the drilling tool of the fifth embodiment shown in FIG. 16, in the movable portion 44 of the cartridge 39, the forward end portion 44A to which the burr removing tip 41 is attached and the rear end portion 44B which is mounted to the pin 43 of the stationary portion 42 are deviated in the circumferential direction of the tool main body 31.

That is, in the fourth embodiment shown in FIG. 15, the rear end portion 44B is, contrary to the third embodiment, deviated parallel toward the tool rotating direction T with respect to the forward end portion 44A of the movable portion 44 to which the burr removing tip 41 is mounted in conformity with the twisting of the land 37 as a result of the twisting of the chip discharge grooves 32, and, compared with the third embodiment, the portion lying off the land 37 of the groove 38 and the cartridge 39 can be diminished in proportion to this deviation. Further, in the fifth embodiment shown in FIG. 16, the rear end portion 44B is deviated with respect to the forward end portion 44A of the movable portion 44 such that there is a difference in height toward the tool rotating direction T, and, as shown in the drawing, the groove 38 and the cartridge 39 are prevented from extending beyond the land, making it possible to reliably mount to the land 37 the cartridge 37 equipped with the movable portion 44 having a needed length.

While in the fourth and fifth embodiments the forward end portion 44A and the rear end portion 44B of the movable portion 44 of the cartridge 39 are deviated in parallel in the circumferential direction of the tool main body 31 or differ in height, it is also possible to form the portion between the forward end portion 44A and the rear end portion 44B such that it extends obliquely in conformity with the twisting of the chip discharge grooves 32 or to form the movable portion 44 itself obliquely excluding the tip mounting seat and the portion mounted to the pin 43. Further, the construction of the fourth and fifth embodiments in which the forward end portion 44A and the rear end portion 44B of the movable portion 44 of the cartridge 39 are deviated in the circumferential direction of the tool main body 31, is also applicable to a drilling tool using a compression coil spring, a plate spring, a belleville spring or the like as the biasing member, and the same effect can be achieved in that case.

Numerous variations of the present invention are possible in light of the above teachings. It is therefore to be understood that within the scope of the appended claims, the present invention can be practiced other than as specifically described herein.

What is new and desired to be secured by Letters Patent of the United States:

1. A drilling tool comprising:
   a tool main body having a cutting edge at a forward end;
   a groove provided in a peripheral surface at the forward end of the tool main body;
   a cartridge accommodated in the groove and capable of elastic deformation in a radial direction of the tool main body; and
   a burr removing tip in the form of a substantially triangular flat plate detachably mounted to the cartridge by a fastening device and capable of protruding from and retracting into the peripheral surface of the tool main body through elastic displacement of the cartridge,
   wherein the tool main body has a recess configured to provide access to the fastening device whereby the fastening device can be detached when the cartridge is accommodated within the groove.

2. A drilling tool according to claim 1, wherein:
   the burr removing tip is formed in a shape of a triangle having three side surfaces;
   the cartridge is equipped with two holding walls that are in face contact with two of the three side surfaces of the burr removing tip; and
   a remaining side surface of the three side surfaces is in an open state.

3. A drilling tool according to claim 2, wherein the burr removing tip is mounted in a condition in which one apex portion of the triangle formed by the burr removing tip is directed radially to an outer periphery of the tool main body and in which a side surface opposed to this apex portion and a side surface positioned on a rear end side of the tool main body are in face contact with the two holding walls of the cartridge.

4. A drilling tool according to claim 1, wherein the groove is formed so as to be open at the forward end of the tool main body.

5. A drilling tool according to claim 1, wherein the groove is formed so as not to be open at the forward end of the tool main body.

6. A drilling tool comprising:
   a tool main body having a cutting edge at a forward end; and
   a burr removing tip held by a cartridge provided in the tool main body and elastically biased toward an outer periphery of the tool so as to be capable of protruding from and retracting into the outer periphery, the burr removing tip being detachably mounted to the cartridge by a fastening device,
   wherein the cartridge uses a torsion coil spring as a biasing member for elastically biasing the burr removing tip, and
   wherein the tool main body has a recess configured to provide access to the fastening device whereby the fastening device can be detached when the cartridge is provided in the tool main body.

7. A drilling tool comprising:
   a tool main body having a cutting edge at a forward end and rotatable around an axis; and
   a burr removing tip held by a cartridge provided in the tool main body and elastically biased toward an outer periphery of the tool so as to be capable of protruding from and retracting into the outer periphery of the tool,
   wherein the burr removing tip is in the form of an equilateral triangular flat plate having an equilateral triangular surface directed to a tool rotating direction as a scooping surface, and a corner portion of the equilateral triangular surface is positioned in the outer periphery of the tool, and wherein the burr removing tip is held such that a bottom side thereof opposed to the corner portion of the equilateral triangular surface is substantially parallel to an axis as seen from the tool rotating direction, with the burr removing tip being within an outer peripheral surface of the tool main body.

8. A drilling tool comprising:
   a tool main body having a cutting edge at a forward end; and
   a burr removing tip held by a cartridge provided in the tool main body and elastically biased toward an outer periphery of the tool so as to be capable of protruding from and retracting into the outer periphery,
   wherein the cartridge has a movable portion having a rear end portion supported by the tool main body and a forward end portion to which the burr removing tip is mounted and capable of being displaced in a radial direction of the tool main body, the forward end portion and the rear end portion of the movable portion being formed so as to be deviated in a circumferential direction of the tool main body.

* * * * *